United States Patent
Iwashita et al.

(10) Patent No.: US 7,084,596 B2
(45) Date of Patent: Aug. 1, 2006

(54) SERVOMOTOR DRIVING CONTROLLER

(75) Inventors: Yasusuke Iwashita, Yamanashi (JP);
Hiroyuki Kawamura, Yamanashi (JP);
Tang Zhiwei, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 10/767,058

(22) Filed: Jan. 30, 2004

(65) Prior Publication Data
US 2004/0183495 A1    Sep. 23, 2004

(30) Foreign Application Priority Data
Jan. 30, 2003    (JP)    ............... 2003-022102

(51) Int. Cl.
*G05B 1/06*    (2006.01)

(52) U.S. Cl. ................ 318/638; 318/630; 318/632

(58) Field of Classification Search ........... 318/568.13, 318/632, 638, 560, 609, 610, 561, 625; 369/44.34, 369/47.42, 47.44, 53.14; 700/29, 69
See application file for complete search history.

(56) References Cited

U.S. PATENT DOCUMENTS

| | | | |
|---|---|---|---|
| 5,059,881 A * | 10/1991 | Fujita et al. ................ 318/630 |
| 5,153,490 A * | 10/1992 | Ueta et al. .................. 318/571 |
| 5,367,238 A * | 11/1994 | Sakamoto et al. .......... 318/630 |
| 5,517,100 A | 5/1996 | Matsubara et al. |
| 5,598,077 A | 1/1997 | Kakino et al. |
| 5,666,034 A * | 9/1997 | Seoung et al. .................. 318/6 |
| 5,710,498 A * | 1/1998 | Yutkowitz et al. .......... 318/632 |
| 5,767,645 A * | 6/1998 | Park ............................ 318/650 |
| 5,773,938 A * | 6/1998 | Seong et al. ..................... 318/6 |
| 5,880,566 A * | 3/1999 | Seong ........................ 318/463 |
| 5,907,450 A * | 5/1999 | Ishikawa ................ 360/78.09 |
| 6,046,566 A * | 4/2000 | Sonoda et al. .............. 318/625 |
| 6,107,771 A * | 8/2000 | Maeda ........................ 318/630 |
| 6,252,368 B1 * | 6/2001 | Sugie ..................... 318/568.22 |
| 6,437,534 B1 * | 8/2002 | Kakino et al. .............. 318/569 |
| 6,472,842 B1 * | 10/2002 | Ehsani ........................ 318/701 |
| 6,686,716 B1 * | 2/2004 | Predina et al. .............. 318/560 |
| 6,721,247 B1 * | 4/2004 | Watanabe ................ 369/44.34 |
| 6,784,632 B1 | 8/2004 | Tomita |
| 6,845,068 B1 * | 1/2005 | Watanabe ................ 369/44.34 |
| 6,859,007 B1 * | 2/2005 | Toyozawa et al. .......... 318/632 |
| 2001/0002097 A1 * | 5/2001 | Tsutsui ........................ 318/560 |
| 2003/0016607 A1 * | 1/2003 | Cho et al. ................. 369/47.42 |
| 2004/0145333 A1 * | 7/2004 | Toyozawa et al. .......... 318/632 |

(Continued)

FOREIGN PATENT DOCUMENTS

EP    0 292 574    11/1988

(Continued)

OTHER PUBLICATIONS

Communication and European Search Report dated Sep. 13, 2005 (8 pages).

(Continued)

*Primary Examiner*—Paul Ip
(74) *Attorney, Agent, or Firm*—Staas & Halsey LLP

(57) ABSTRACT

A servomotor driving controller capable of highly accurate machining, which prevents a quadrant projection upon change in the quadrant where machining is made. After the position deviation converges to zero by means of learning control, the velocity command or a difference between the velocity command and the commanded velocity which is the derivative of the position command is stored as velocity correction data. Until a predetermined time period elapses from when the sign of the position command is reversed, an amount of correction for each period of position loop processing is determined based on the correction data, and used to correct the velocity command.

13 Claims, 12 Drawing Sheets

U.S. PATENT DOCUMENTS

2004/0150363 A1 * 8/2004 Toyozawa et al. ..... 318/568.13
2004/0183495 A1 * 9/2004 Iwashita et al. ............ 318/638

FOREIGN PATENT DOCUMENTS

| EP | 0 389 641 | | 10/1990 |
|---|---|---|---|
| EP | 0 540 761 | | 5/1993 |
| EP | 0 547 239 | | 6/1993 |
| EP | 752754 | A1 * | 1/1997 |
| EP | 0 913 749 | | 5/1999 |
| EP | 1 184 766 | | 3/2002 |
| GB | 2 373 066 | | 9/2002 |
| JP | 7-110717 | | 4/1995 |
| JP | 10056791 | A * | 2/1998 |
| JP | 10-268916 | | 10/1998 |
| JP | 2002-258922 | | 9/2002 |
| WO | WO 01/88649 | A1 | 11/2001 |

OTHER PUBLICATIONS

Notification of Decision of Rejection; Ref. No. 2164OP; Dispatch No. 493490; Dispatch Date Jan. 10, 2006 for Patent Application No. 022102/2003.

* cited by examiner

WITHOUT QUADRANT
PROJECTION CORRECTION

CONVENTIONAL QUADRANT
PROJECTION CORRECTION

LEARNING
CONTROL

FIRST EMBODIMENT
OF THE INVENTION

SECOND EMBODIMENT
OF THE INVENTION

SERVOMOTOR DRIVING CONTROLLER

BACKGROUND OF THE INVENTION

1. Field of the Invention

The present invention relates to a controller for drivingly controlling servomotors that are used to drive feed axes of a machine tool table, etc., and more particularly, to a servomotor driving controller for suppressing formation of a projection on a machined surface of a workpiece in the process of machining the workpiece attached to a table upon reversal of the moving direction of a feed axis of the table.

2. Description of Related Art

In a machine tool or the like, upon reversal of the driving direction of a servomotor which drives a feed axis of a machine tool table, the table cannot immediately be reversed due to backlash of a feed screw and friction. Therefore, in the process of for example circular arc cutting a workpiece mounted to the table, a projection is formed on the circular arc cutting surface of the workpiece when the driving direction is reversed.

It is assumed here that the workpiece mounted to the table to be movable in an XY coordinate plane is subject to circular arc cutting, with the circular arc center positioned at the coordinate origin and with the X and Y axes moved in the positive and negative directions, respectively, and there occurs a quadrant change such that the Y axis is kept moved in the negative direction but the moving direction of the X axis is changed from positive to negative. Upon such quadrant change, the Y axis is kept driven at the same driving velocity, whereas the X axis attempts to reverse the moving direction when the positional deviation is reduced to zero and the torque command becomes small. However, immediate reversal cannot be realized due to the presence of friction. Moreover, attributable to backlash of the feed screw, the table movement in the X axis direction is delayed when the moving direction of the X axis is reversed. In this manner, there occurs a delay in direction reversal upon quadrant change, and as a result, a projection is formed in the cutting surface, which projection will be referred to as quadrant projection.

In order to reduce the quadrant projection, various correction methods have been proposed (see, for example, JP 7-110717A).

However, these proposed methods making adjustments of a correction amount added for reduction of quadrant projection while confirming results of the corrections require much time for adjustments.

SUMMARY OF THE INVENTION

The present invention provides a servomotor driving controller capable of making a correction for reduction of a quadrant projection with ease.

According to an aspect of the present invention, a servomotor driving controller comprises: velocity command determining means for determining and outputting a velocity command at every predetermined period based on a deviation between a position command from a host controller and a position feedback signal from a position detector; and correction means for correcting the velocity command outputted from the velocity command determining means based on correction data for a predetermined time period, to thereby improve machining accuracy.

The correction data may be predetermined using learning control. For instance, the correction data may be determined by performing the learning control based on position deviations for predetermined periods obtained in repeatedly driving a driven member in a predetermined region by the servomotor to obtain a velocity command, and by subtracting a differentiated value of the position command from the velocity command obtained by the learning control. The correction data may be determined by analyzing correction data obtained by the learning control.

The servomotor driving controller may further comprise detecting means for detecting reversal of the position command, and the correction data may be predetermined for the predetermined time period from time of reversal of the position command, and the correction means may correct the velocity command based on the correction data for the predetermined time period from the reversal of the position command detected by the detecting means.

The servomotor driving controller may be connected with a computer for preparing the correction data.

The servomotor driving controller may further comprise detecting means for detecting reversal of the position command, and the correction data for the predetermined time period from reversal of the position command may be predetermined based on an output from an inverse function of an open-loop transfer function for generating the torque command from the velocity command when a model of friction acting on a controlled object is inputted. The correction data may be determined by filtering the output from the inverse function. Further, the correction data may be advanced by a delay time of the filtering to thereby compensating for the delay time.

According to another aspect of the present invention, a servomotor driving controller comprises: torque command determining means for determining and outputting a torque command at every predetermined period based on a deviation between a velocity command and a velocity feedback signal from a velocity detector, the velocity command being obtained based on a deviation between a position command from a host controller and a position feedback signal from a position detector; and correction means for correcting the torque command outputted from the torque command determining means based on correction data for a predetermined time period.

In this case also, the correction data may be predetermined using learning control. For instance, the correction data may be determined by performing the learning control based on position deviations for predetermined periods obtained in repeatedly driving a driven member in a predetermined region by the servomotor to obtain a torque command, and by subtracting a second-order differentiated value of the position command from the torque command obtained by the learning control. The correction data may be determined by analyzing correction data obtained by the learning control.

The servomotor driving controller may further comprise detecting means for detecting reversal of the position command, and the correction data may be predetermined for the predetermined time period from time of reversal of the position command, and the correction means may correct the torque command based on the correction data for the predetermined time period from the reversal of the position command detected by the detecting means.

DETAILED DESCRIPTION

Figure 1:
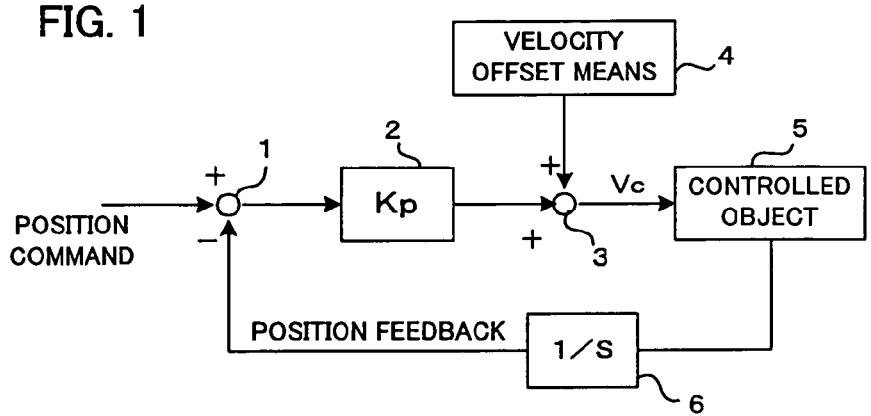
FIG. 1 is a block diagram showing essential part of a servomotor driving controller according to a first embodiment of this invention.

Referring to FIG. 1, a servomotor driving controller according to a first embodiment of this invention comprises a subtractor 1 for determining a position deviation by subtracting a position feedback signal from a position command. The position feedback signal represents an actual position of a servomotor serving as a controlled object 5, or of a movable part such as a table which is driven by the servomotor, and the position command is supplied from a host controller such as a numerical controller. The driving controller further comprises a multiplier 2 for determining a velocity command by multiplying the position deviation by a position gain Kp, and an adder 3 for determining a corrected velocity command by adding a correction amount, which is determined from correction data set beforehand in a velocity offset means 4, to the velocity command. The servomotor serving as controlled object 5 is driven according to the corrected velocity command. Reference numeral 6 denotes a position detecting section for determining an actual position of the controlled object 5 by integrating a velocity feedback signal supplied from a velocity detector attached to the controlled object 5.

Figure 2:
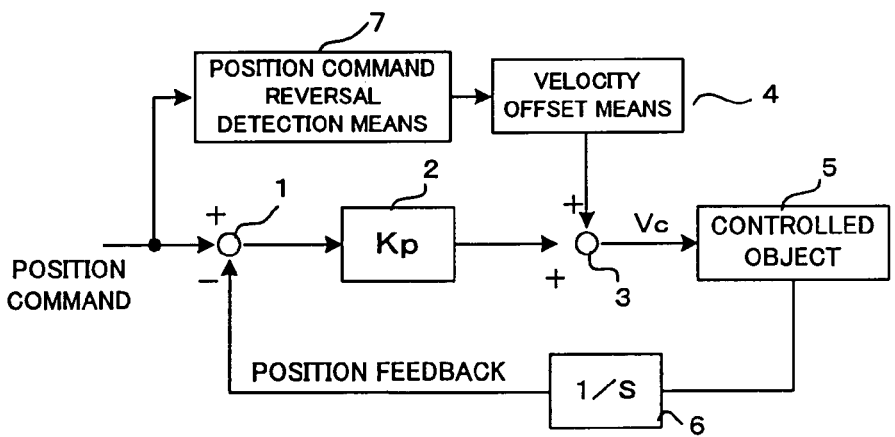
FIG. 2 is a block diagram showing essential part of a servomotor driving controller according to a second embodiment of this invention.

FIG. 2 shows a servomotor driving controller according to a second embodiment of this invention, which differs from the first embodiment in that it comprises a position command reversal detection means 7 for detecting the sign of the position command being reversed and for outputting a correction start command to the velocity offset means 4. In response to the correction start command, the velocity offset means 4 adds a correction amount determined based on the velocity command data to a velocity command until a predetermined time period has elapsed from when the correction start command was output, to thereby determine a corrected velocity command with which the controlled object 5 is drivingly controlled.

Figure 3:
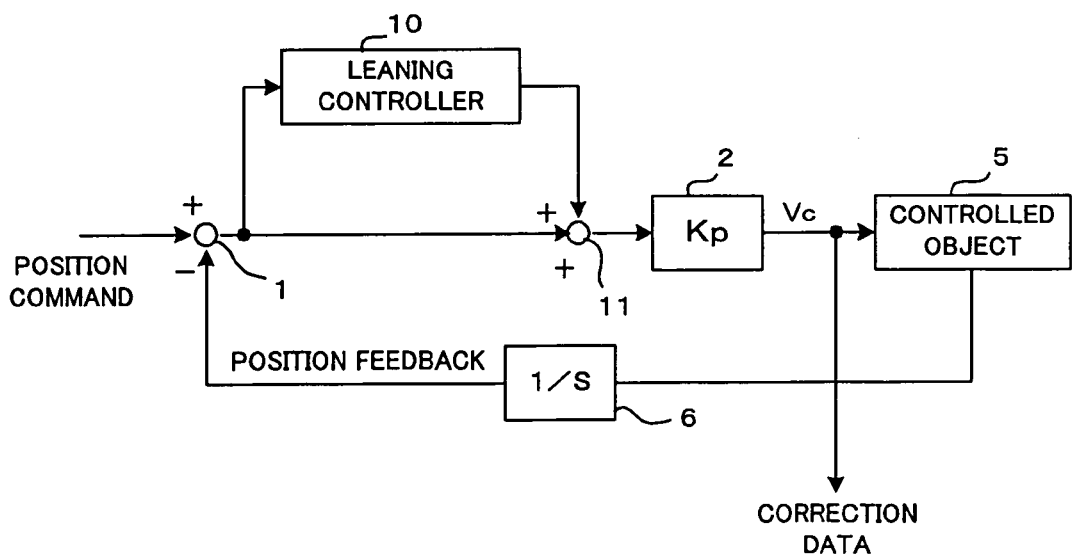
FIG. 3 is a block diagram for explaining an arrangement for preparing velocity correction data by learning control for the first and second embodiments.
Figure 4:
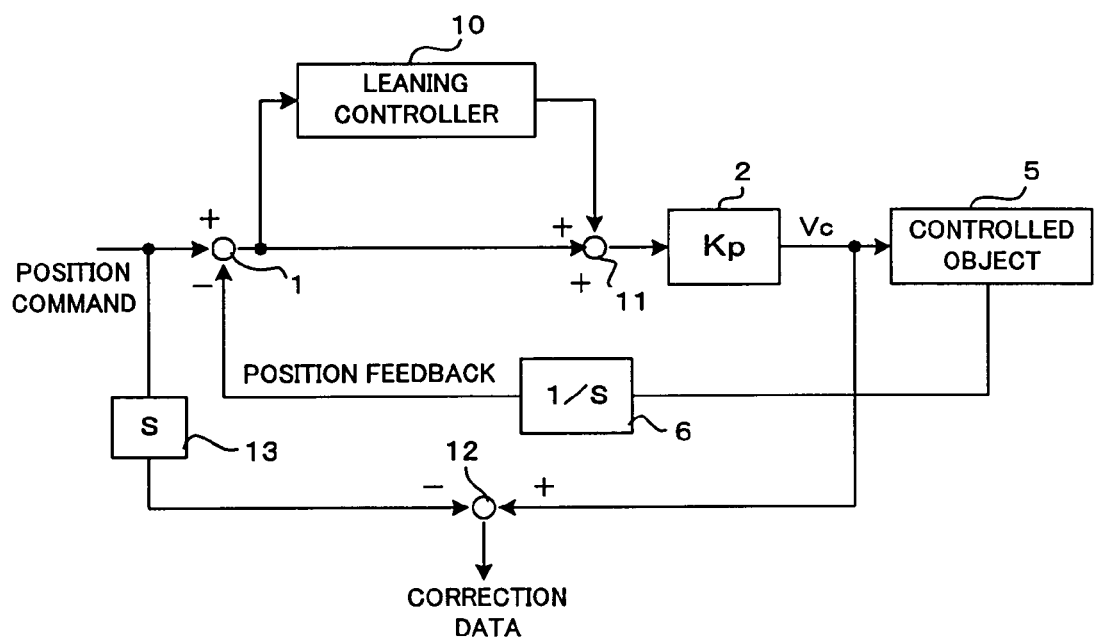
FIG. 4 is a block diagram for explaining another arrangement for preparing the velocity correction data.

FIGS. 3 and 4 show how the velocity correction data to be stored in the velocity offset means 4 is prepared.

In the method for the correction data preparation shown in FIG. 3, a learning control is performed by means of a learning controller 10 additionally provided in the position loop control system of the controller, to thereby obtain a velocity command which is to be set to the velocity offset means 4 as the velocity correction data. Specifically, a position deviation is determined by the subtractor 1 by subtracting the position feedback signal, indicative of an actual position of the controlled object 5, from a position command supplied from the host controller, and the position deviation is stored in the learning controller 10. The learning controller 10 determines a correction amount based on the one period old position deviation, and the adder 11 adds the correction amount to the position deviation to determine a corrected position deviation. The multiplier 2 multiplies the corrected position deviation by a position gain Kp to determine a velocity command used for the control of the drive of the controlled object 5.

The learning controller 10 may be a known one that comprises a storage section for storing pieces of data, indicative of position deviations that are determined at intervals of a predetermined cycle in a time period for which one pattern's position command are output in a case where the position command is repeatedly output in a pattern in order to machine workpieces into the same shape. The learning controller 10 adds the currently determined position deviation and the stored data indicative of the one pattern old position deviation together, and the resultant sum is stored as data of the present period after being subject to filtering. The one pattern old stored data is subject to dynamic characteristic compensation processing, and then output to be added to the position deviation. By repeating the above-described learning control, the position deviation converges to zero, as is known.

Specifically, the position deviation converges to zero, if a set of instructions for machining a predetermined zone in which quadrant projection may be formed are repeatedly executed while performing the aforementioned learning control. After the position deviation being converged to zero, the learning controller 10 corrects the position deviation. Then, the corrected position deviation is multiplied by the position gain Kp to determine a velocity command for use as velocity correction data for the velocity offset means 4. The velocity correction data can be regarded as a velocity command with which highly accurate machining can be made. The correction, i.e., the addition of the velocity correction data to the velocity command, can produce effects similar to those obtainable by a feedforward control.

In a feedforward control, the derivative of the position command is added to the velocity command to thereby compensate for a delay in position control attributable to a position gain, so that the position deviation becomes close to zero. With the feedforward control, the derivative of the position command can serve as an ideal velocity command, only if the velocity control system of the controller has an adequate following up characteristic. In case that the controlled object is highly affected by backlash, there occurs a rapid change in additional torque upon direction change to make it difficult to attain an adequate following up characteristic, so that the position deviation (quadrant projection) is caused.

The learning control can produce an effect of sufficiently suppressing the formation of quadrant projection irrespective whether the following up performance of the velocity control system is adequate. Thus, the velocity command subject to the learning control before being output can practically be regarded as an ideal velocity command superior to that obtainable by the conventional feedforward control. The velocity correction data obtained by the method shown in FIG. 3 is equivalent to the ideal velocity command, and therefore, use of the velocity command corrected by the velocity correction data at the timing in phase with the learning control makes it possible to carry out machining with high shape accuracy.

FIG. 4 is a block diagram for explaining another method for obtaining correction data. The example shown in FIG. 4 is common to the method of FIG. 3 in that the position command repeatedly instructed in the same pattern is subject to the learning control by the learning controller 10, but differs in that it comprises a differentiating element 13 for differentiating the position command to obtain a commanded velocity, and a subtractor 12 for determining a velocity difference by subtracting the commanded velocity from a velocity command that is obtained by multiplying the corrected position deviation, which is obtained by the learning control, by the position gain Kp. After the position deviation is converged to zero by the learning control, the subtractor 12 subtracts the commanded velocity from the velocity command to determine the velocity difference that is to be used as the velocity correction data for the velocity offset means 4.

In the method shown in FIG. 4, the derivative of the position command corresponding to the controlled variable in the feedforward control is subtracted from the velocity command obtained by the learning control, thereby collecting a disturbance compensating component of the velocity command obtained by the learning control. The disturbance compensating component (data) collected after the position command being reversed in sign can be regarded as being able to correct the quadrant projection caused by the presence of backlash. Thus, the velocity correction obtained based on such data can be applied to realize an optimum correction of the quadrant projection.

The velocity correction data obtained as described above may be used as it is, however, the thus obtained correction data includes noise, and hence it is preferable that second correction data be prepared by removing the noise.

Figure 5:
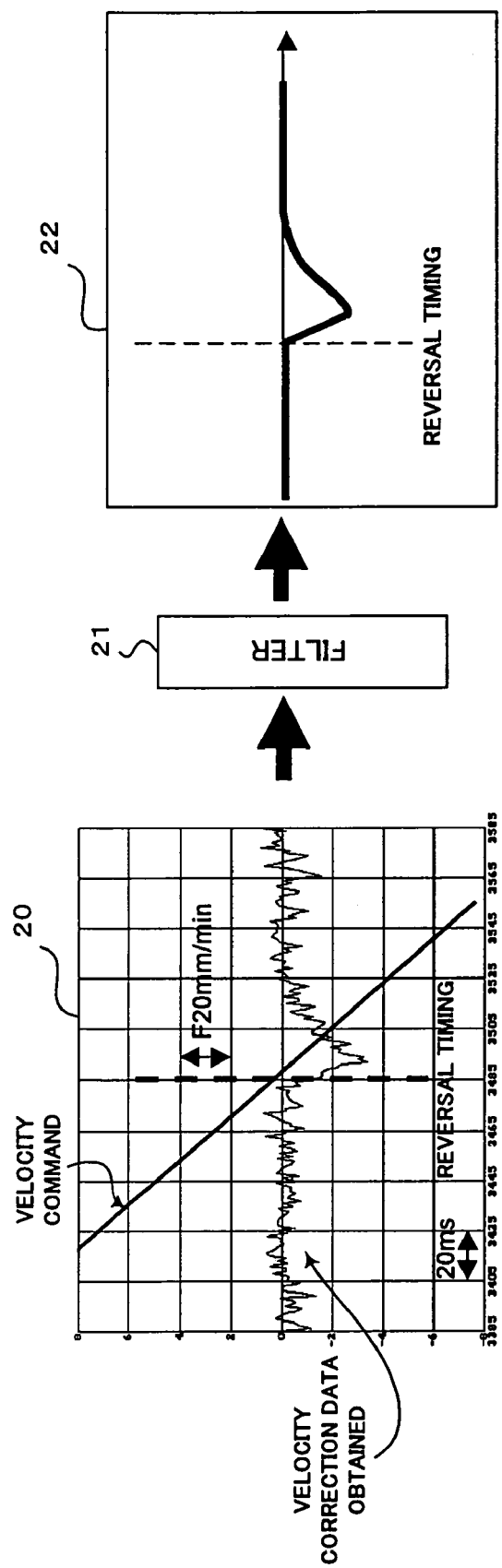
FIG. 5 is a view for explaining an arrangement for obtaining a second velocity correction data by removing noise from the velocity correction data obtained by the learning control.

FIG. 5 shows a method for preparing the second correction data, in which reference numeral 20 denotes velocity correction data collected in a zone where the moving direction changes and in a condition that the position deviation is converged to zero by means of the learning control. This velocity correction data 20 is shown as an example of ones determined from a difference between the commanded velocity shown in FIG. 4 and the actual velocity command.

In FIG. 5 showing the collected correction data, time and velocity correction data are taken along abscissa and ordinate, respectively, and the straight line extending from upper left to lower right denotes the velocity command. The correction data includes noise, and a large velocity difference is caused when the moving direction changes. The collected correction data is supplied to a filter 21 to remove noise components thereof, whereby the second correction data shown at 22 is obtained.

Figure 6:
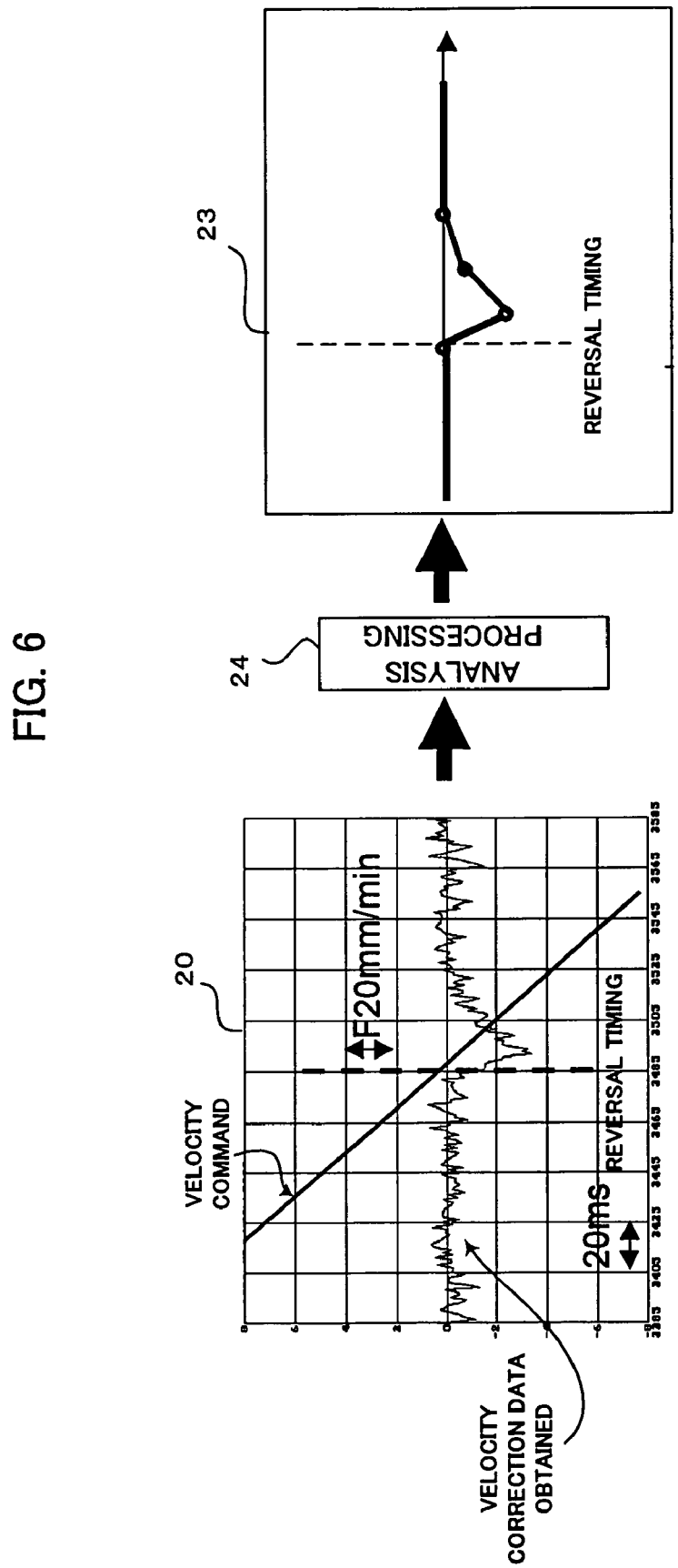
FIG. 6 is a view for explaining an arrangement for obtaining a second velocity correction data by linearly approximating the velocity correction data obtained by the learning control.

Alternatively, as shown in FIG. 6, the collected correction data 20 may be analyzed to obtain the second velocity correction data which is linearly approximated as shown at 23.

In the embodiment of FIG. 1 using velocity correction data in respect of one pattern's motion commands, the one pattern's motion commands may be collected to be set, as velocity correction data, in the velocity offset means 4. Alternatively, motion commands in a zone where the sign of motion command is reversed may be collected and analyzed in a manner as mentioned above to obtain analyzed data, and, for other zones, set data may be obtained which is comprised of collected motion commands or zero components. Then, second velocity correction data comprised of the analyzed data and the set data may be set in the velocity offset means 4.

In the embodiment of FIG. 2 using velocity correction data in respect of a predetermined zone where the sign of position command is reversed, position commands are collected in the predetermined zone and stored as velocity correction data in the velocity offset means 4. Alternatively, the velocity correction data obtained in the predetermined zone is analyzed to be stored as second velocity correction data in the velocity offset means 4.

Figure 7:
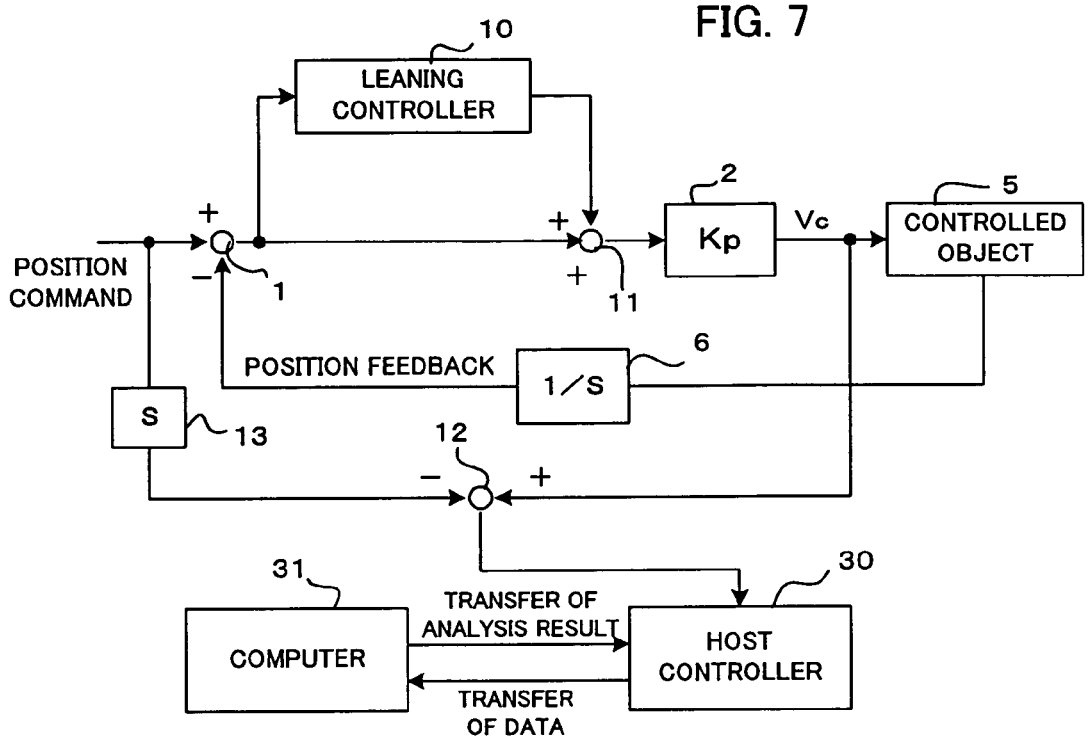
FIG. 7 is a block diagram of an arrangement for analyzing collected velocity correction data to obtain final velocity correction data.
Figure 10:
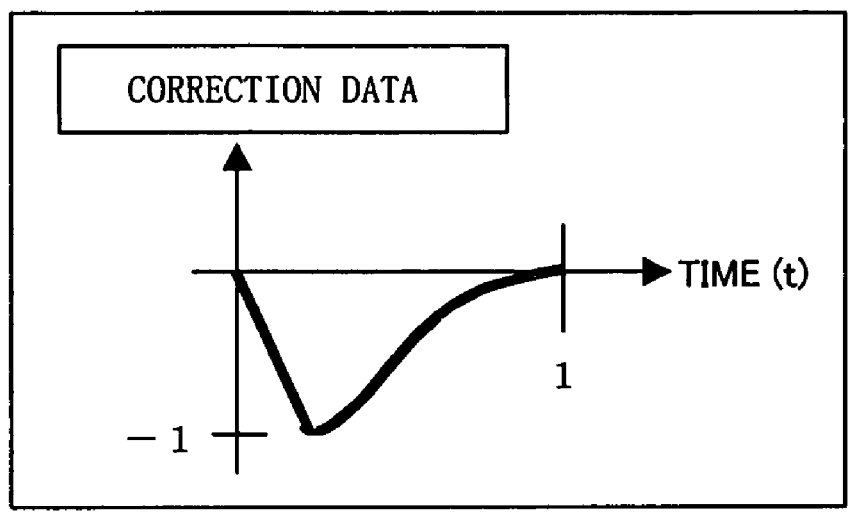
FIG. 10 is a view for explaining normalized velocity correction data.
Figure 11:
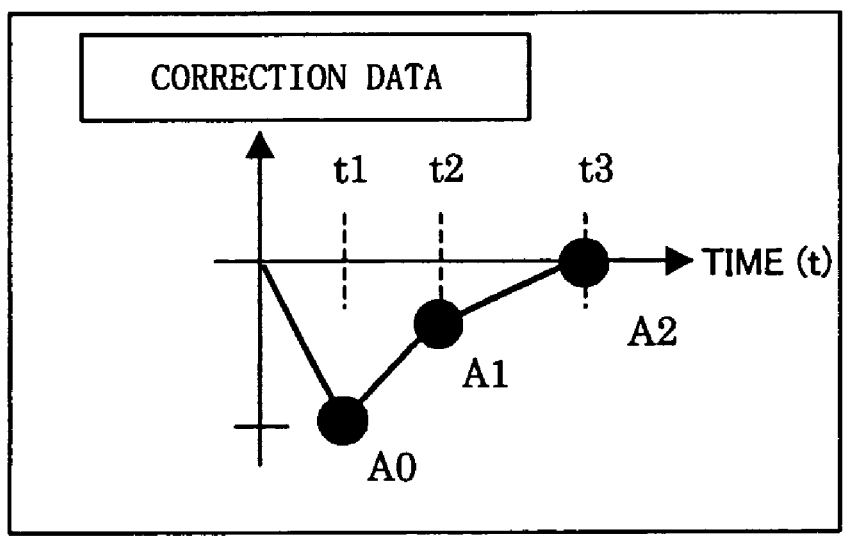
FIG. 11 is a view for explaining linearly approximated velocity correction data.

In order to obtain the second correction data 22 or 23, analysis is made by using a host controller 30 or an external computer 31, as shown in FIG. 7. In the example shown in FIG. 7, the collected correction data obtained by the method shown in FIG. 4 is transferred to the host controller 30 such as a numerical controller, and transferred from the host controller 30 to the computer 31 which carries out filtering or linear approximation to prepare the second correction data 22 or 23. In case that linear approximation is performed, the correction data include, as shown in FIG. 11, at least correction amounts (for example, A0, A1 and A2) at start and end points of an approximate straight line and elapsed times (for example, t1, t2 and t3) at these points measured from the start of correction. On the other hand, if no linear approximation is performed, the correction data is normalized, in which a maximum correction amount is set to be 1 and a time period from start to end of the correction is set to be 1, as shown in FIG. 10. Then, the linearly approximated or normalized correction data, i.e., the second correction data, is transferred from the computer 31 through the host controller 30 to the servomotor driving controller, and is set in the velocity offset means 4. The second correction data may be prepared in the host controller 30.

Figure 8:
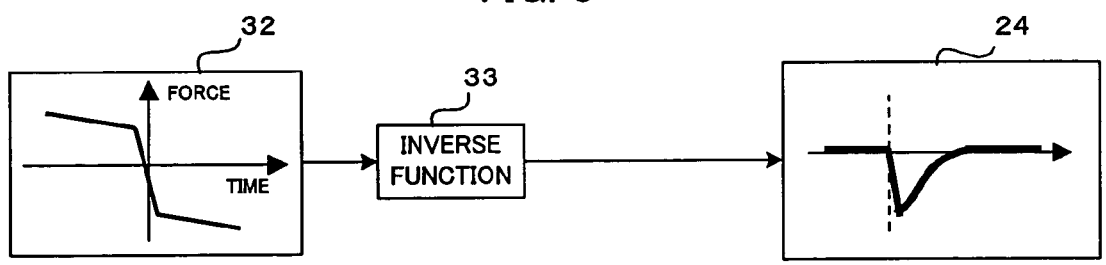
FIG. 8 is a block diagram of an arrangement for preparing velocity correction data by using a friction model.

In the above-described embodiments, the correction data is determined from the velocity command obtained by the learning control. Alternatively, the correction data may be determined by using a friction model at the time of the moving direction being changed. In FIG. 8, an example of the friction model is shown at 32, in which time and friction force are taken along abscissa and ordinate, respectively. The velocity correction data 24 is obtained by multiplying an output of the model 32 by an inverse function 33 of an open loop transfer function of the system for producing the torque command from the velocity command. In case that the controller comprises a velocity controller for performing velocity loop control processing to determine a torque command (such as a velocity controller, mentioned later and shown in FIG. 15, for performing velocity loop processing based on a velocity command supplied from the position loop system), the open loop transfer function (the transfer function of the velocity controller) and its inverse function are represented by $Cv(S)$ and $Cv(S)^{-1}$, respectively.

Figure 9:
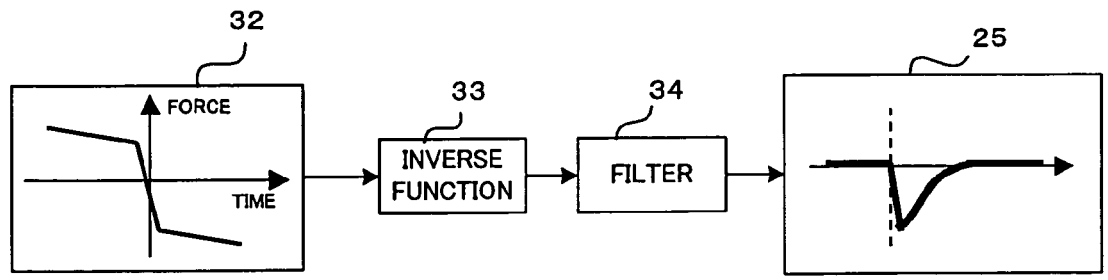
FIG. 9 is a block diagram of an arrangement for preparing velocity correction data not including noise by using the friction model.

The velocity correction data, determined by using the friction model and the inverse function of the velocity controller, includes high frequency components which cause a fear of abruptly changing the correction amount, by extension the velocity command to which the correction amount is added. Thus, as shown in FIG. 9, the high frequency components may be removed by using a filter 34, thereby obtaining correction data 25 having a frequency zone to which the velocity control can follow up. In this case, a time delay is caused in the filtered correction data. For instance, in the case of using a filter 34 which is comprised of a first order filter whose transfer function is represented by $1/(TS+1)$, the delay time is regarded as being equal to the rise time T, or is determined or estimated for example by calculating a phase delay at that maximum amplitude of input waveform to the filter 34 which is determined by means of frequency analysis. In the case of the filter 34 comprised of an M-th order FIR filter, a delay about M/2 times as long as the sampling time is caused, and such delay is used as the delay time. The velocity correction data is set in the velocity offset means, with the correction data advanced with the delay time determined as described above.

The velocity correction data is analyzed to obtain the linearly approximated correction data shown in FIG. 11 or the normalized correction data shown in FIG. 10. Such velocity correction data is prepared by the host controller 30 or the external computer and delivered therefrom to the servomotor driving controller to be set in the feed velocity offset means 4.

Figure 12:
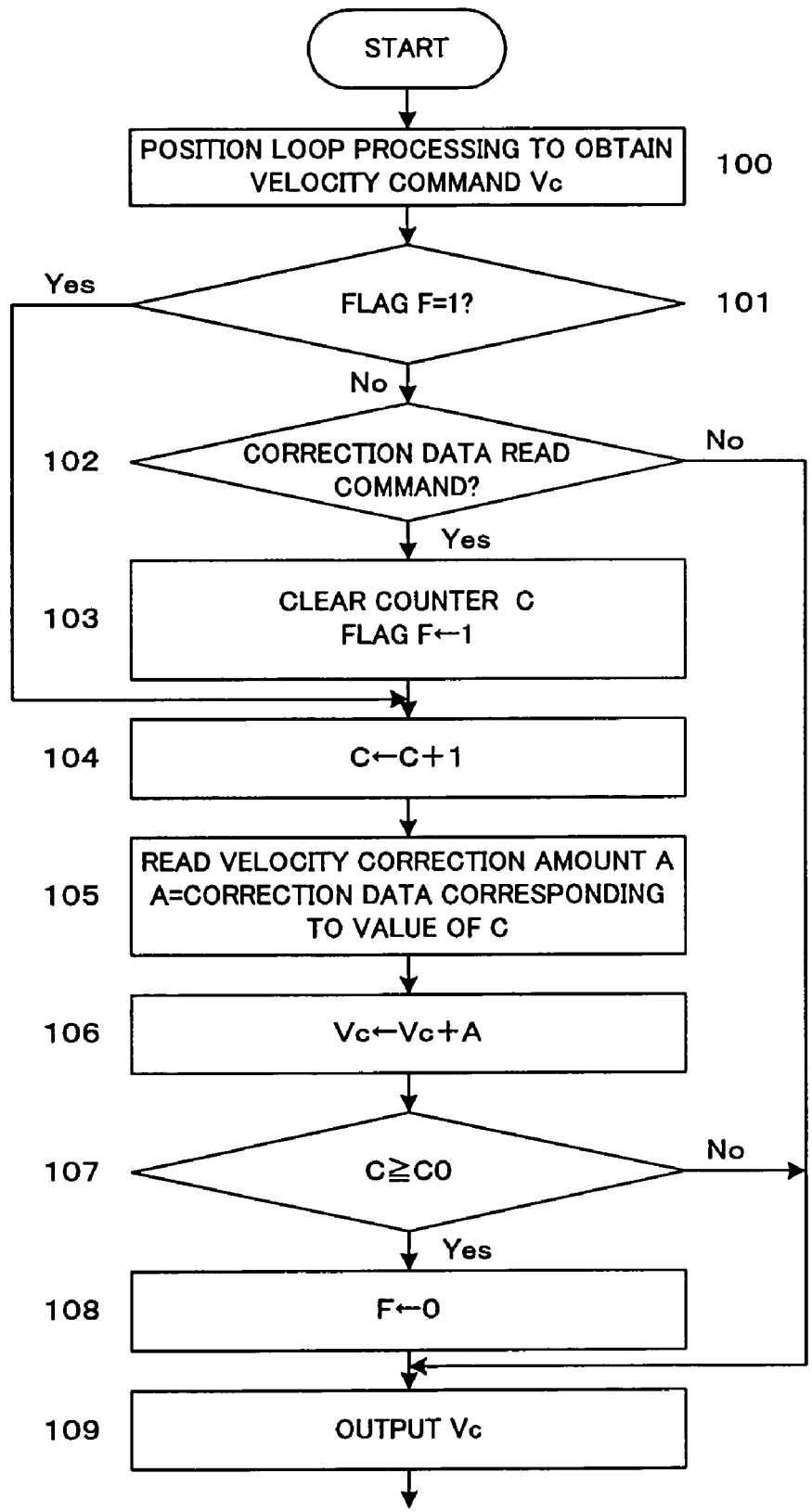
FIG. 12 is a flowchart of velocity correction processing in the first embodiment.

FIG. 12 is a flowchart of the velocity correction processing shown in FIG. 1 and executed by a processor of the servomotor driving controller by using the aforementioned correction data.

The processor of the controller executes the processing shown in FIG. 12 in every position loop processing period.

First, a position deviation is determined based on a position command supplied from the host controller and a position feedback signal, and the position deviation is multiplied by the position gain Kp to determine a velocity command Vc (Step 100). Next, whether or not a flag F is set to 1 is determined (Step 101), and if not so, a determination is made as to whether a correction data reading command is input (Step 102). If such a command is not input, the flow proceeds to Step 109 which delivers the velocity command Vc determined at Step 100 to subsequent velocity loop control processing.

If the correction data reading command is input, a counter C is cleared and the flag F is set to 1 (Step 103). Then, the counter C is incremented by 1 (Step 104), and velocity correction data, corresponding to a value stored in the counter C and serving as a correction amount A, is read from a storage section in which pieces of velocity correction data are stored (Step 105). The correction amount A is added to the velocity command Vc determined at Step 100, thereby obtaining a corrected velocity command Vc (Step 106). Next, a determination is made as to whether the counter value reaches a preset value C0 indicative of the end of a zone in which the velocity command is to be corrected (Step 107). If the preset value C0 is not reached, the flow proceeds to Step 109 which outputs the corrected velocity command Vc.

In the next and subsequent periods before which the flag F has been set to 1, the flow proceeds from Step 101 to Step 104 after completion of the position loop processing to determine the velocity command Vc at Step 100. Whereupon, the processing at Steps 104–109 is performed so that the velocity command Vc determined by the position loop processing is corrected by using the velocity correction data stored in the velocity offset means. The corrected velocity command Vc serves as velocity command for the next velocity loop processing, etc.

The just-mentioned velocity command correction is carried out in every position loop processing period. Subsequently, if the value in the counter C reaches the preset value C0 (Step 107), the flag F is reset to 0 (Step 108) and the flow proceeds to Step 109. In the next and subsequent periods where the flag F is not at 1, the processing of Steps 100–102 and 109 is repeatedly executed until the correction data reading command is input again.

In this embodiment, the velocity command correction based on velocity correction data is performed over the predetermined zone from when the correction data reading command is input, whereby a quadrant projection is suppressed from being formed, thus realizing highly accurate machining.

Figure 13:
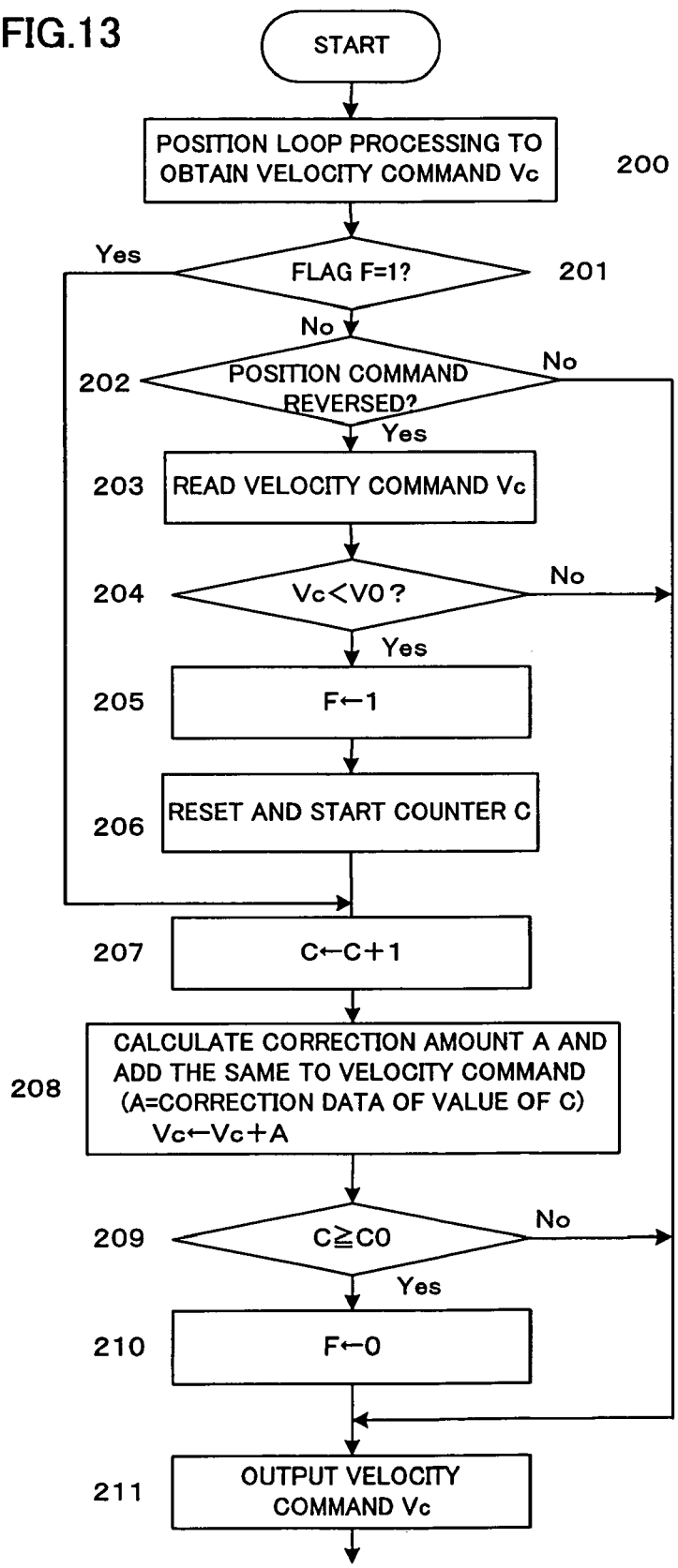
FIG. 13 is a flowchart of velocity correction processing in the second embodiment.

FIG. 13 is a flowchart of processing executed by the processor of the servomotor driving controller to embody the method shown in FIG. 2. In the example shown in FIG. 13, the correction data that is normalized for a moving direction reversal zone as shown in FIG. 10 is used as velocity correction data.

At first, the position loop processing is performed to determine a velocity command Vc (Step 200). Specifically, the velocity command Vc is obtained by determining a position deviation between a position command and a position feedback signal and by multiplying the position deviation by a position gain. Next, whether a flag F is set to 1 is determined (Step 201), and if not so, a further determination is made as to whether or not the sign of the position command supplied from the host controller, the moving direction, is reversed (Step 202). If the sign or direction is not reversed, the flow proceeds to Step 211 which delivers the velocity command Vc obtained at Step 200 to the next processing (such as velocity loop processing).

On the other hand, if it is determined at Step 202 that the sign of the position command from the host controller, and by extension the quadrant to which the machining position belongs, is reversed, a further determination is made as to whether the velocity command determined by the position loop processing at Step 200 is less than a preset velocity V0 (Step 204). If not so, the flow proceeds to Step 210. If the velocity command is less than the preset value V0, the flag F is set to 1 (Step 205), and the counter C is reset (Step 206).

Then, the counter C is incremented by 1 (Step 207), and a correction amount A is determined by multiplying a value of velocity correction data, corresponding to the value of the counter C, by a proportional coefficient A0. The correction amount A is added to the velocity command Vc determined at Step 200, thereby obtaining a new, corrected velocity command (Step 208).

Next, a determination is made as to whether the value of the counter C is equal to or larger than a value C0 that is set beforehand so as to correspond to a correction time period (Step 209), the preset value C0 indicating the number of position loop processing periods included in the correction time period. If the counter value does not reach the preset value C0, the flow proceeds to Step 211 which delivers the corrected velocity command Vc obtained at Step 208.

In the next and subsequent periods before which the flag F has been set to 1, the flow proceeds from Step 201 to Step 207 to determine a correction amount A, which is added to the velocity command obtained by the position loop processing, to obtain and output a corrected velocity command. Thereafter, the processing of Steps 200, 201, 207–209, and 211 is repeatedly performed to determine a corrected velocity command by adding a correction amount determined based on correction data to a velocity command determined by the position loop processing. Subsequently, if the value in the counter C reaches the preset value C0, the flow proceeds from Step 209 to Step 210 which resets the flag F to 0, and then proceeds to Step 211 which outputs the corrected velocity command obtained at Step 208.

In the next and subsequent periods where the flow proceeds from Step 201 to Step 202 since the flag F has been reset to 0, the above-described processing is executed, in which the velocity command correction based on velocity correction data is performed for the predetermined zone, after the velocity command becomes less than the predetermined value subsequent to the reversal of the sign of the position command or the moving direction command, whereby the fear of a projection being formed upon quadrant change is reduced.

Figure 14:
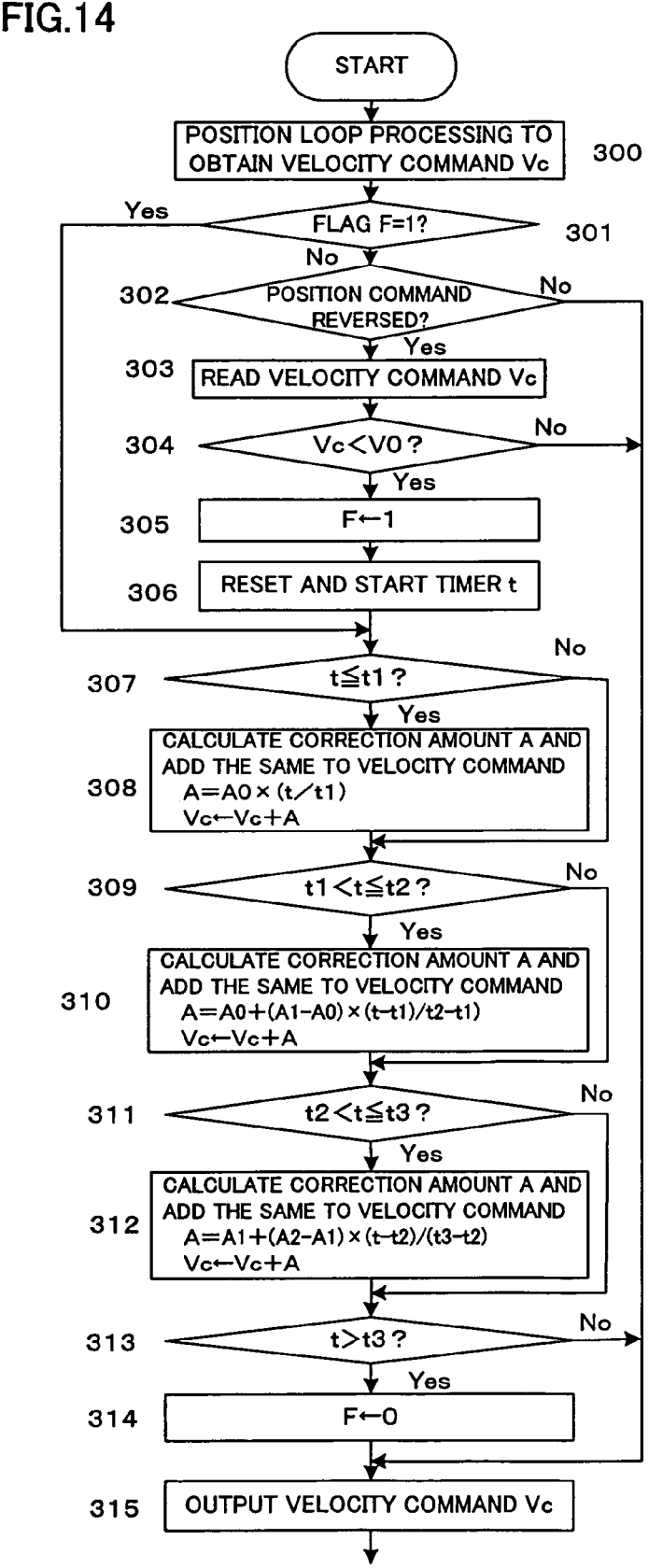
FIG. 14 is a flowchart of another velocity correction processing in the second embodiment.

The processing shown in FIG. 13 is executed in case that the correction data shown in FIG. 10 is stored in the memory (velocity offset means) of the servomotor driving controller. In case of the linearly approximated data shown in FIG. 11 being stored in the memory serving as velocity offset means, the processing shown in FIG. 14 is executed, in which the processing of Steps 300–305 which is the same as that of Steps 200–205 of FIG. 13 is executed, and then the processing of Steps 306–315 different from that of Steps 206–211 is executed.

Specifically, the processing of Steps 300–304 and 315 is carried out in every position loop processing period before the sign of position command is reversed and the velocity command Vc becomes less than the predetermined value V0, so that the velocity command Vc determined by normal position loop processing (Step 300) is output. On the other hand, if the sign of position command is reversed and the velocity command Vc becomes less than the predetermined value V0 so that a moving position area where the machining quadrant changes is entered, the controller processor causes a timer t to be reset and started again (Step 306), and determines whether a time period measured by the timer t is equal to or less than a first preset time t1, which is stored in advance as velocity correction data (Step 307). If the measured time t is equal to or less than the preset time t1, a correction amount A0 stored corresponding to the preset time t1 is multiplied by a time ratio t/t1 to determine a correction amount A, and a corrected velocity command is determined by adding the correction amount A to the velocity command Vc determined at Step 300 (Step 308).

If the measured time t, time period measured by the timer t, is between the first and second preset times t1 and t2, that is, if the relation of t1<t≦t2 is satisfied (Step 309), a correction amount A is determined by interpolation based on correction amounts A0 and A1 stored corresponding to the first and second preset times t1 and t2, respectively, in accordance with the following formula:

$$A=A0+(A1-A0)\times(t-t1)/(t2-t1)$$

The correction amount A is added to the velocity command Vc obtained at Step 300, whereby a corrected velocity command is determined (Step 310).

If it is determined at Step 311 that the measured time t is between the second and third preset times t2 and t3 (t2<t≦t3), a correction amount A is determined by interpolation of correction amounts A2, A3 respectively corresponding to the preset times t2, t3 in accordance with the following formula:

$$A=A1+(A2-A1)\times(t-t2)/(t3-t2)$$

The correction amount A is then added to the velocity command Vc obtained at Step 300, whereby a corrected velocity command is determined (Step 312).

At Step 315, the corrected velocity command is delivered to the next processing.(such as velocity loop processing or electric current loop processing).

If the measured time t exceeds the third preset time t3 indicative the end of the correction time period (Step 313), the flag F is reset to 0 (Step 314), and the flow proceeds to Step 315.

As described above, when the quadrant of machining position is changed, the velocity command is corrected based on correction data, to prevent the quadrant projection.

Although the quadrant projection is prevented by the velocity command correction in the embodiments, it is also possible to prevent the quadrant projection by correcting the torque command.

Figure 15:
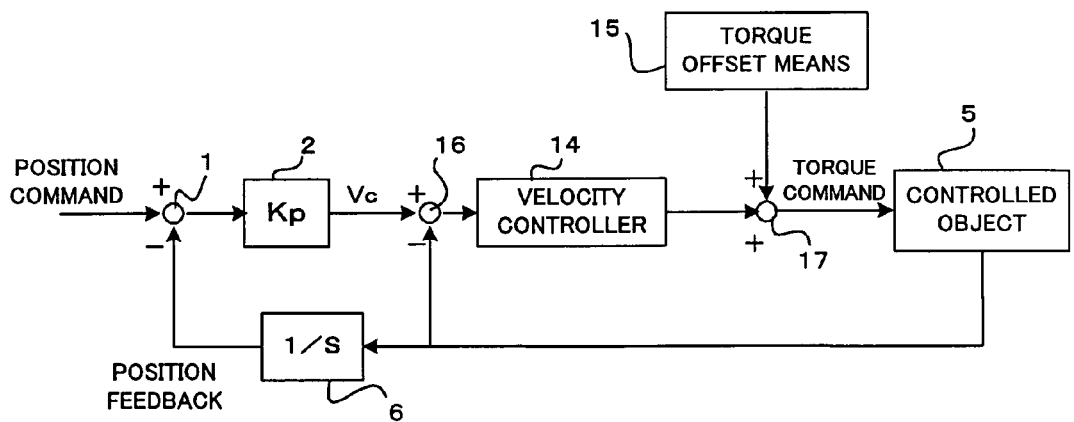
FIG. 15 is a block diagram showing a servomotor control system according to a third embodiment in which a torque command is corrected to prevent a quadrant projection.

FIG. 15 is a block diagram of a servomotor control system according to a third embodiment, in which the torque command is corrected in order to prevent the quadrant projection. The third embodiment shown in FIG. 15 differs from the embodiment shown in FIG. 1 in that a velocity controller 14 is additionally provided, and a torque offset means 15 for adding a torque correction amount to a torque command output from the velocity controller 14 is provided instead of the velocity offset means 4.

Specifically, a position deviation is determined by the subtractor 1 in which a position feedback signal, indicative of an actual position of the servomotor serving as the controlled object 5 or of a movable part of a table, etc. driven by the servomotor, is subtracted from a position command supplied from the host controller. The position deviation is multiplied by the position gain Kp in the multiplier 2 to determine a velocity command from which a velocity feedback signal is subtracted in the subtractor 16 to determine a velocity deviation that is supplied to the velocity controller 14 in which the velocity deviation is subject to a PI (proportional integral) control, etc. to determine a torque command, whereas a torque correction amount is determined from torque correction data set in advance in the torque offset means 15. The torque correction amount is added to the torque command to thereby determine a corrected torque command with which the servomotor serving as the controlled object 5 is driven, whereby a quadrant projection is prevented.

Figure 16:
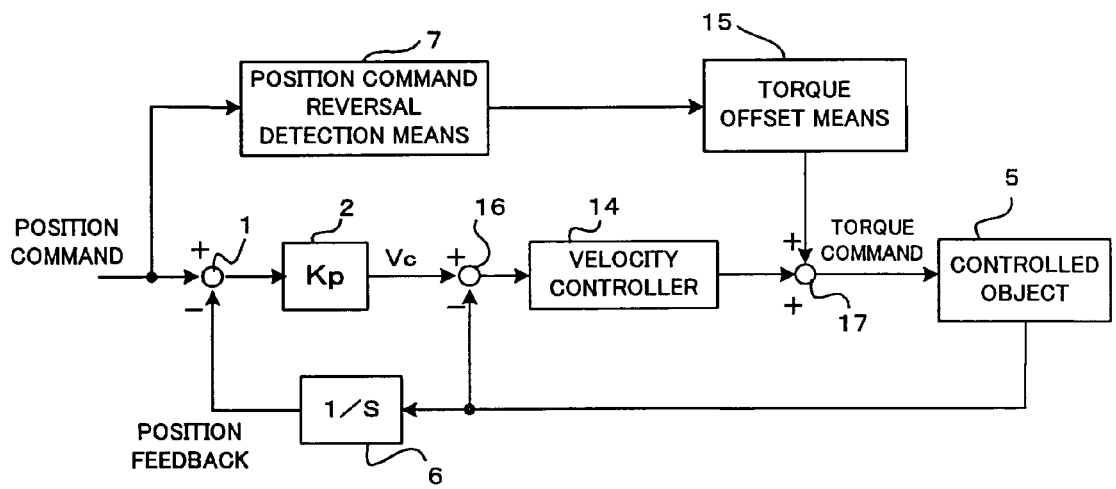
FIG. 16 is a block diagram showing a servomotor control system according to a fourth embodiment in which a correction of torque command is performed to prevent a quadrant projection.

FIG. 16 is a block diagram showing a fourth embodiment which differs from the third embodiment shown in FIG. 15 in that reversal detection means 7 is provided which detects the sign of position command being reversed and which outputs a correction start command to the torque offset means 15. Until a predetermined time period has elapsed from when the correction start command was output from the reversal detection means 7, a torque correction amount determined based on the preset torque correction data is added to the torque command to determine a corrected torque command with which the servomotor serving as controlled object is drivingly controlled.

Figure 17:
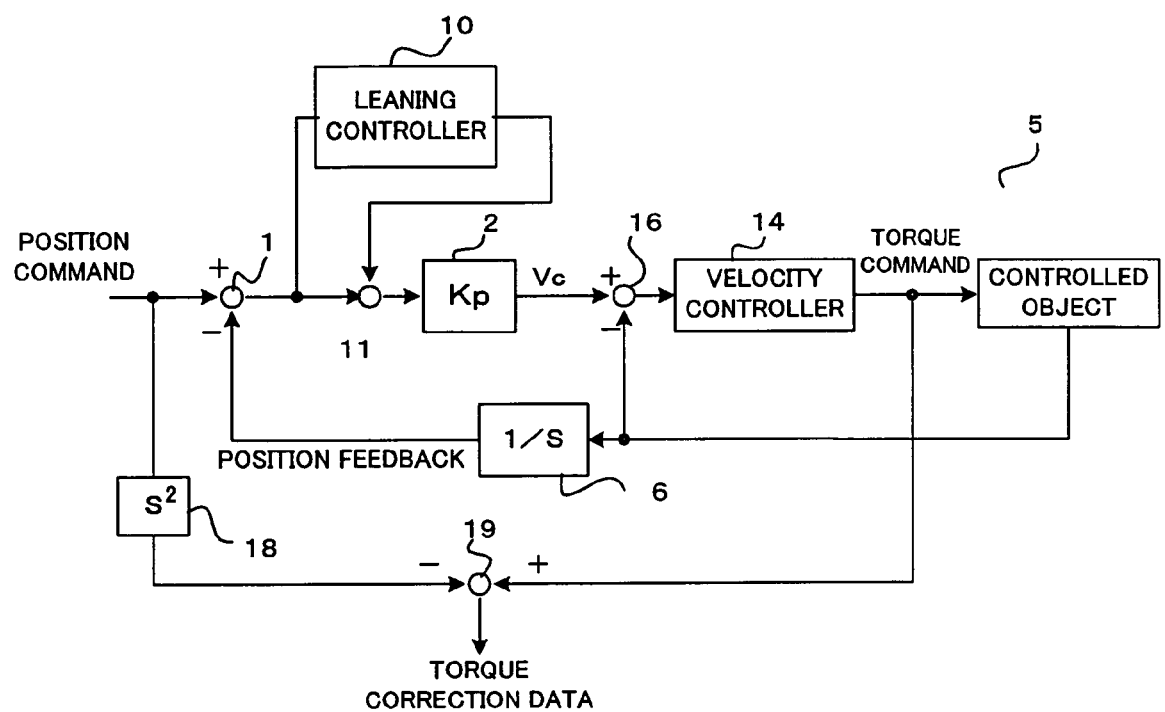
FIG. 17 is a view for explaining an arrangement for preparing torque correction data in the third and fourth embodiments.

FIG. 17 is a block diagram showing a method for preparing the torque correction data, which method differs from the method shown in FIG. 4 for determining velocity correction amount in that a velocity controller 14 is additionally provided, and a second order differentiating element 18 for subjecting the position command to second order differentiation to determine acceleration is used instead of the differential element 13 for differentiating the position command. As in the embodiments shown in FIGS. 3 and 4, the learning controller 10 comprises a storage section for storing pieces of data corresponding to position deviations, which are determined at intervals of a predetermined period in a time period for which one pattern's position commands are output. The position deviation determined in the present period is added to data that was determined and stored on the basis of one pattern old position deviation, and the resultant sum is subject to filtering and then stored as data of the present period. The stored data of one pattern period old is subject to dynamic characteristic compensation processing, and is then output to be added to the position deviation.

In the controller shown in FIG. 17, a position deviation is determined by means of the subtractor 1 in which a position feedback signal, indicative of an actual position of the controlled object 5, is subtracted in the subtractor 1 from a position command supplied from the host controller. This position deviation is stored in the learning controller 10. In the adder 11, a correction amount determined based on a one period old position deviation is added to the position deviation, thereby deter a corrected position deviation which is then multiplied by a position gain Kp in the multiplier 2, to determine a velocity command from which a velocity feedback amount is subtracted in the subtractor 16 to determine a velocity deviation. Based on the velocity deviation, velocity loop processing is performed by the velocity controller 14 to determine a torque command (acceleration command) with which the controlled object 5 is drivingly controlled.

The position deviation converges to zero, if a set of commands for machining a predetermined zone in which a quadrant projection may be formed are repeatedly executed while performing the leaning control. After the position deviation being converged to zero, the learning controller 10 corrects the position deviation, and the corrected position deviation is multiplied by the position gain Kp to determine a velocity command. Velocity loop control processing is performed by the velocity controller 14 to determine a torque command based on the velocity command and a velocity feedback signal, whereas a commanded acceleration is determined by the second order differentiating element 18 by subjecting the position command to second order differentiation. In the subtractor 19, the commanded acceleration is subtracted from the torque command to thereby determine a difference therebetween which is set as torque correction data in the torque offset means. Meanwhile, as in the first and second embodiments, the torque correction data determined from the difference between the torque command and the commanded acceleration may be subject to filtering to remove noise, so that the resultant data may serve as a second torque correction data. Alternatively, the torque correction data may be linearly approximated to obtain a second torque correction data.

The torque correction data is normalized or linearly approximated, so as to be in the same form as the velocity correction data.

The torque correction data is stored in the torque offset means 15 for use in correcting the torque command for prevention of occurrence of a quadrant projection.

In a servomotor driving controller according to an embodiment which corrects the torque command so as to prevent a quadrant projection, processing (not shown) is performed for every position/velocity loop processing period, which processing is substantially the same as that shown in FIGS. 12–14, but differs in the following points: Position loop processing to determine the velocity command is performed, and velocity loop processing to determine the torque command is performed based on the velocity command and velocity feedback signal, as conventionally known in a step corresponding to Step 100, 200 or 300 (illustration of this step and below-mentioned steps are omitted), a correction amount A is determined based on the torque correction data at a step corresponding to Step 105, 208, 308, 310 or 312, this torque correction data is added to the torque command determined in a step corresponding to Step 100, 200 or 300, thereby determining a corrected torque command, and the corrected torque is output in a step corresponding to Step 109, 211 or 315, instead of outputting the velocity command.

FIGS. 18A through 18E are views showing results of experiments conducted to evaluate effects of this invention, in which errors in circular arc cutting are indicated in units of 2 μm, and the indication of errors in regions each enclosed by a circle are given at greater magnification.

Figure 18A:
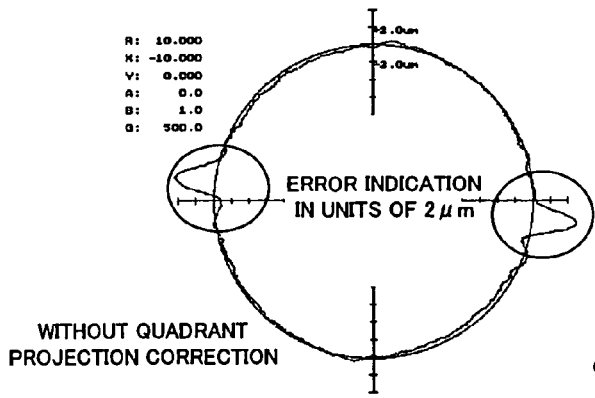
FIGS. 18A through 18E are views showing results of experiments to evaluate effects of this invention.
Figure 18B:
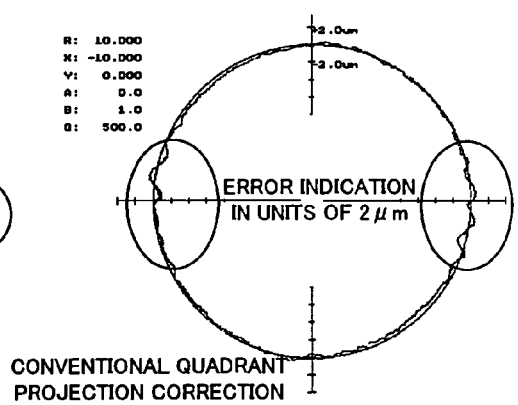
Figure 18C:
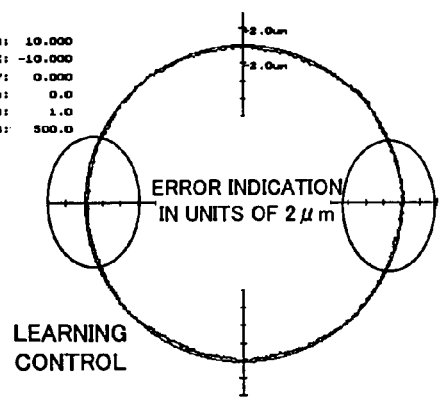
Figure 18D:
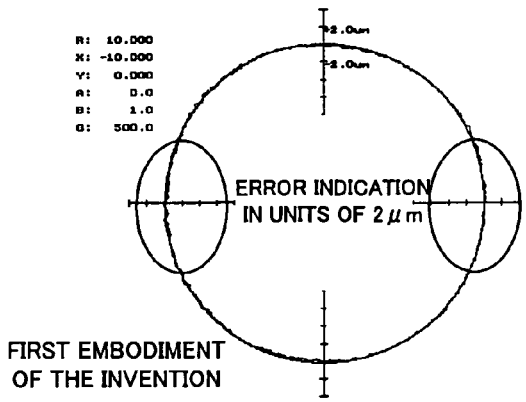
Figure 18E:
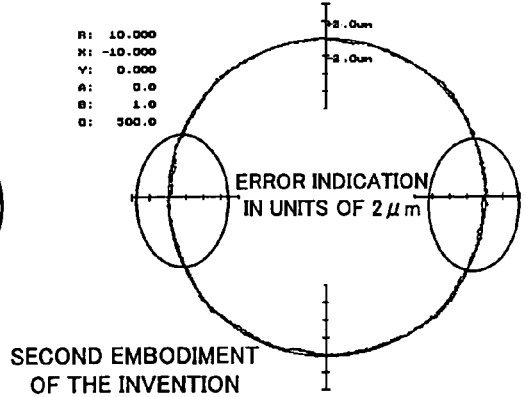

FIG. 18A indicates errors in case that no correction to reduce a quadrant projection is made, FIG. 18B indicates errors in the case of a conventional correction to reduce a quadrant projection being made, FIG. 18C indicates errors in the case of a learning control being made, and FIGS. 18D, 18E indicate errors in the first and second embodiments of this invention, respectively.

As understood from the results of experiments, the quadrant projection (the error relative to the command) that is formed in a machined surface upon quadrant change becomes greatest when no quadrant projection correction is made (FIG. 18A), and it becomes the next greatest when the conventional quadrant projection correction is applied (FIG. 18B). By applying the learning control (FIG. 18C), the quadrant projection is reduced. In the case of applying the present invention (FIGS. 18D and 18E), there occurs substantially no quadrant projection, resulting in machining accuracy that is equivalent to the accuracy observed when the quadrant is kept unchanged.

What is claimed is:

1. A servomotor driving controller for drivingly controlling a servomotor, comprising:
    velocity command determining means for determining and outputting a velocity command at every predetermined period based on a deviation between a position command from a host controller and a position feedback signal from a position detector; and
    correction means for correcting the velocity command outputted from said velocity command determining means based on correction data for a predetermined time period,
    wherein the correction data are predetermined by performing a learning control based on position deviations for predetermined periods in repeatedly driving a driven member in a predetermined region by the servomotor.

2. A servomotor driving controller according to claim 1, wherein the correction data are determined by performing the learning control based on position deviations for predetermined periods obtained in repeatedly driving a driven member in a predetermined region by the servomotor to obtain a velocity command, and by subtracting a differentiated value of the position command from the velocity command obtained by the learning control.

3. A servomotor driving controller according to claim 1, wherein the correction data are determined by analyzing correction data obtained by the learning control.

4. A servomotor driving controller according to claim 1, further comprising detecting means for detecting reversal of the position command,
wherein the correction data are predetermined for the predetermined time period from time of reversal of the position command, and said correction means corrects the velocity command based on the correction data for the predetermined time period from the reversal of the position command detected by said detecting means.

5. A servomotor driving controller according to claim 1, further comprising a computer for preparing the correction data connected therewith.

6. A servomotor driving controller for drivingly controlling a servomotor, comprising:
velocity command determining means for determining and outputting a velocity command at every predetermined period based on a deviation between a position command from a host controller and a position feedback signal from a position detector; and
correction means for correcting the velocity command outputted from said velocity command determining means based on correction data for a predetermined time period,
wherein the correction data for the predetermined time period from reversal of the position command are predetermined based on an output from an inverse function of an open-loop transfer function for generating the torque command from the velocity command when a model of friction acting on a controlled object is inputted.

7. A servomotor driving controller according to claim 6, wherein the correction data are determined by filtering the output from the inverse function.

8. A servomotor driving controller according to claim 6, wherein the correction data are advanced by a delay time of the filtering to thereby compensating for the delay time.

9. A servomotor driving controller for drivingly controlling a servomotor, comprising:
torque command determining means for determining and outputting a torque command at every predetermined period based on a deviation between a velocity command and a velocity feedback signal from a velocity detector, the velocity command being obtained based on a deviation between a position command from a host controller and a position feedback signal from a position detector; and
correction means for correcting the torque command outputted from said torque command determining means based on correction data for a predetermined time period,
wherein the correction data are predetermined using learning control based on position deviations for predetermined periods in repeatedly driving a driven member in a predetermined region by the servomotor.

10. A servomotor driving controller according to claim 9, wherein the correction data are determined by analyzing correction data obtained by the learning control.

11. A servomotor driving controller according to claim 9, further comprising a computer for preparing the correction data connected therewith.

12. A servomotor driving controller for drivingly controlling a servomotor, comprising:
torque command determining means for determining and outputting a torque command at every predetermined period based on a deviation between a velocity command and a velocity feedback signal from a velocity detector, the velocity command being obtained based on a deviation between a position command from a host controller and a position feedback signal from a position detector; and
correction means for correcting the torque command outputted from said torque command determining means based on correction data for a predetermined time period,
wherein the correction data are predetermined using learning control, the correction data being determined by performing the learning control based on position deviations for predetermined periods obtained in repeatedly driving a driven member in a predetermined region by the servomotor to obtain a torque command, and by subtracting a second-order differentiated value of the position command from the torque command obtained by the learning control.

13. A servomotor driving controller for drivingly controlling a servomotor, comprising:
torque command determining means for determining and outputting a torque command at every predetermined period based on a deviation between a velocity command and a velocity feedback signal from a velocity detector, the velocity command being obtained based on a deviation between a position command from a host controller and a position feedback signal from a position detector;
correction means for correcting the torque command outputted from said torque command determining means based on correction data for a predetermined time period; and
detecting means for detecting reversal of the position command,
wherein the correction data are predetermined for the predetermined time period from time of reversal of the position command, and said correction means corrects the torque command based on the correction data for the predetermined time period from the reversal of the position command detected by said detecting means.

* * * * *

UNITED STATES PATENT AND TRADEMARK OFFICE
CERTIFICATE OF CORRECTION

PATENT NO. : 7,084,596 B2
APPLICATION NO. : 10/767058
DATED : August 1, 2006
INVENTOR(S) : Yasusuke Iwashita et al.

It is certified that error appears in the above-identified patent and that said Letters Patent is hereby corrected as shown below:

Title Page Column 1 (U.S. Patent Documents), Line 5, change "Kakino et al." to --Matsubara et al.--.

Title Page Column 1 (U.S. Patent Documents), Line 8, change "318/650" to --318/560--.

Page 2 Column 2 (Other Publications), Line 1, change "2164OP;" to --216420P;--.

Page 2 Column 2 (Other Publications), Line 2, after "Date" insert --:--.

In the drawings:

FIG. 3, change "LEANING" to --LEARNING--.

FIG. 4, change "LEANING" to --LEARNING--.

FIG. 7, change "LEANING" to --LEARNING--.

FIG. 14, change "(t-t1)/t2-t1)" to --(t-t1)/(t2-t1)--.

FIG. 17, change "LEANING" to --LEARNING--.

Column 10, Line 16, change "processing." to --processing--.

Column 10, Line 58, change "embodiment-" to --embodiment--.

Column 11, Line 33, change "deter" to --determining--.

UNITED STATES PATENT AND TRADEMARK OFFICE
CERTIFICATE OF CORRECTION

PATENT NO. : 7,084,596 B2
APPLICATION NO. : 10/767058
DATED : August 1, 2006
INVENTOR(S) : Yasusuke Iwashita et al.

It is certified that error appears in the above-identified patent and that said Letters Patent is hereby corrected as shown below:

Column 11, Line 44, change "leaning" to --learning--.

Signed and Sealed this

Second Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,084,596 B2
APPLICATION NO. : 10/767058
DATED : August 1, 2006
INVENTOR(S) : Yasusuke Iwashita et al.

It is certified that error appears in the above-identified patent and that said Letters Patent is hereby corrected as shown below:

Title Page Column 1 (U.S. Patent Documents), Line 5, change "Kakino et al." to --Matsubara et al.--.

Title Page Column 1 (U.S. Patent Documents), Line 8, change "318/650" to --318/560--.

Page 2 Column 2 (Other Publications), Line 1, change "2164OP;" to --21640P;--.

Page 2 Column 2 (Other Publications), Line 2, after "Date" insert --:--.

In the drawings:

FIG. 3, change "LEANING" to --LEARNING--.

FIG. 4, change "LEANING" to --LEARNING--.

FIG. 7, change "LEANING" to --LEARNING--.

FIG. 14, change "(t-t1)/t2-t1)" to --(t-t1)/(t2-t1)--.

FIG. 17, change "LEANING" to --LEARNING--.

Column 10, Line 16, change "processing." to --processing--.

Column 10, Line 58, change "embodiment-" to --embodiment--.

Column 11, Line 33, change "deter" to --determining--.

UNITED STATES PATENT AND TRADEMARK OFFICE
CERTIFICATE OF CORRECTION

PATENT NO. : 7,084,596 B2
APPLICATION NO. : 10/767058
DATED : August 1, 2006
INVENTOR(S) : Yasusuke Iwashita et al.

It is certified that error appears in the above-identified patent and that said Letters Patent is hereby corrected as shown below:

Column 11, Line 44, change "leaning" to --learning--.

This certificate supersedes Certificate of Correction issued January 2, 2007.

Signed and Sealed this

Tenth Day of April, 2007

JON W. DUDAS
*Director of the United States Patent and Trademark Office*